May 18, 1965 H. L. FUNK ET AL 3,184,685

WAVEFORM GENERATORS

Filed Dec. 18, 1962 3 Sheets-Sheet 1

INVENTORS
HOWARD L. FUNK
LEON SKARSHINSKI
BY Stephen J. Limanek
ATTORNEY

| A′ | B′ | RELATIVE OUTPUT VOLTAGE |
|---|---|---|
| 0 | 0 | 0 |
| 0 | 1 | 1 |
| 1 | 0 | -2 |
| 1 | 1 | -1 |

May 18, 1965 H. L. FUNK ET AL 3,184,685

WAVEFORM GENERATORS

Filed Dec. 18, 1962 3 Sheets-Sheet 3

3,184,685
WAVEFORM GENERATORS
Howard L. Funk and Leon Skarshinski, Yorktown Heights, N.Y., assignors to International Business Machines Corporation, New York, N.Y., a corporation of New York
Filed Dec. 18, 1962, Ser. No. 245,543
9 Claims. (Cl. 328—61)

This invention relates to waveform generators and more particularly to digital arbitrary waveform generators which may be used in digital data transmission systems.

As is known, binary digits or bits "1" and "0" are generally represented in electronic data machines or computers by first and second direct current levels, respectively. Thus, a "1" bit may be indicated by an electrical pulse or square wave having a given positive or negative magnitude and a "0" bit may be indicated by a pulse of a polarity opposite to that of the "1" pulse, or by the absence of a bit, i.e., by a zero magnitude.

Increasing size and speed of computer systems along with the growth of the concept of centralized data processing has created new requirements for increased speed and reliability of digital communications for long distance transmission of signals. Many system applications are being based upon modes of communications in which different combinations of computers and peripheral equipment from remote locations are tied together.

There are two main types of long transmission lines presently available for the transmission of digital signals to or from computers. The most common communication transmission line is the telephone line designed primarily to carry voice messages. The second type of transmission line is the microwave line which in its commercial application has a very broad band width. The present day commerical television channels fall within the microwave systems. These television channels are well suited for computer to computer communications since they have been designed for transmission of pulses that are similar to the binary signals used in computers.

Although the microwave systems are very desirable for computer to computer communications, these systems are relatively expensive to install and to maintain and are not as common as are the telephone transmission lines. Accordingly, in many instances, telephone circuits must be relied upon for digital data transmission. Although telephone lines have operated very satisfactorily for voice transmission, distortion in these lines which delays certain frequencies in the spectrum of a pulse or square wave more than other frequencies causes a spreading of each individual pulse as it passes through the line. This distortion affects the phase and amplitude of waveforms passing through these lines. Voice signals in the lines are generally not sufficiently distorted so as to prevent detection thereof at the receiving end of the line by the human ear. However, when pulses, particularly square waves, each having a given time duration, are transmitted through telephone lines, the arrival waveform corresponding to each transmitted pulse has a time duration which is many, often 20 or more, times the given time duration of the originally transmitted pulse. The portion of the arrival wave which persists beyond the time corresponding to the given time duration of the transmitted pulse is the cause of intersymbol interference. If a train or series of closely spaced pulses are transmitted, the received pulses may be unreadable due to the intersymbol interference. As a consequence of this intersymbol interference, pulses must be transmitted at a slow rate in order to resolve the received pulses or symbols.

Attempts have been made heretofore to eliminate or at least reduce linear distortion in transmission lines. A technique has been suggested of shaping an input signal for systems whose transforms are known. It has been shown that a predistorted waveforms exists which when impressed upon a transmission line results in a pulse output having a desired relatively short time duration. Another solution which has been proposed involves modification of the distorted received signal from a prior knowledge of the system parameters. It has been further suggested to provide phase correction in a transmission line by time reversal techniques. A pulse was transmitted through a transmission loop and recorded in a magnetic tape recorder. Then the tape was played backwards to re-transmit the signals through the loop so that frequency components of the received signal which were delayed the most were re-transmitted first and those components which suffered the least delay were transmitted last.

In a commonly assigned copending U.S. patent application Serial No. 245,540 filed on even date by E. Hopner and H. R. Ulander, entitled "Transmission Systems," there is described an improved system for reducing phase distortion in a linear transmission system wherein the response of a transmission channel to a test pulse representing a binary one is sampled and quantized at the receiver and coded pulses representative of the values of the samples are transmitted at low speed to the original transmitting point where a predistorted signal is produced from the coded pulses. The predistorted signal in response to data pulses is sent at rapid rates through the transmission line to produce at the receiving end of the line pulses free from intersymbol interference. The successful operation at high speeds of the Hopner-Ulander system is dependent to a large extent upon a suitable generator at the transmitter for producing the predistorted signals or waves.

Accordingly, it is an object of this invention to provide an improved waveform generator.

It is another object of this invention to provide an improved generator for producing analog signals from digital signals.

Still another object of this invention is to provide a versatile waveform generator which may be used for producing various types of predistorted waveforms.

Still a further object of this invention is to provide a waveform generator which is capable of rapidly producing a desired waveform.

In accordance with the present invention, a waveform generator is provided wherein output signals from a plurality of means each of which produces a signal having a given independent value are successively controlled and combined to produce a composite waveform.

An important advantage of the waveform generator of the present invention is that it is capable of rapidly forming a desired output pulse of substantially any desired shape.

An important feature of this invention is that information in the form of digital pulses may be readily utilized to form an analog wave.

The foregoing and other objects, features and advantages of the invention will be apparent from the following more particular description of preferred embodiments of the invention, as illustrated in the accompanying drawings.

Figure 1:
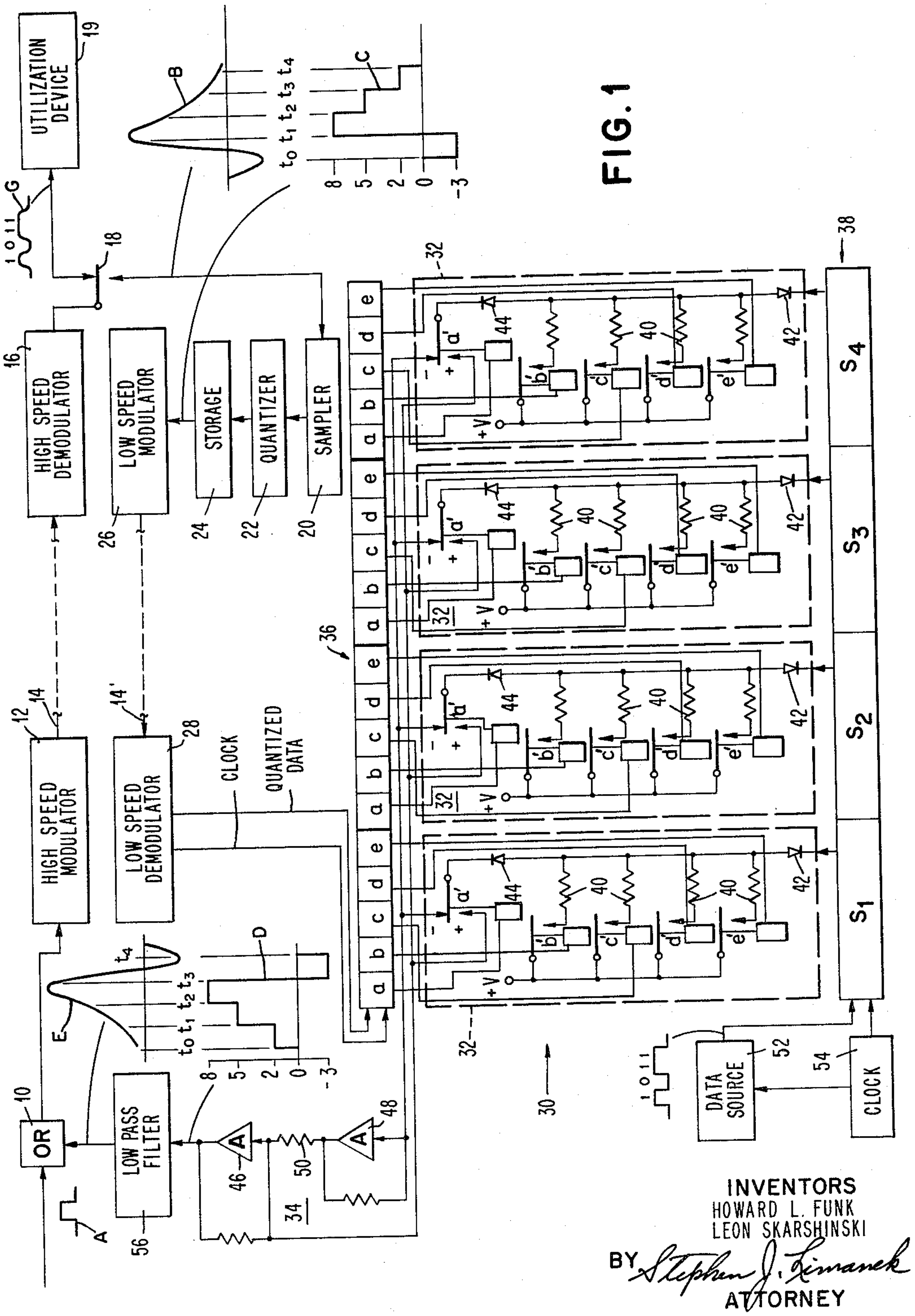
FIG. 1 illustrates one embodiment of the waveform generators of the present invention.

Referring to FIG. 1 of the drawing in more detail, there is shown an embodiment of the generator of the present invention connected in a transmission system of the type disclosed in the above-identified copending application. In the system a test pulse or square wave A is passed through an OR circuit 10, a high speed modulator 12 and a transmission medium 14 to a high speed demodulator 16 wherein at the output thereof there is produced a waveform B corresponding to the test pulse *a* which has been distorted by delay distortion in the transmission medium 14. The high speed modulator 12 and the high speed demodulator 16 are a linear modulator and demodulator, respectively. A switch 18 when closed applies the waveform B to sampler, quantizer and storage units 20, 22 and 24 which produce coded pulses representative of the magnitudes and polarities indicated at wave C. The coded pulses may be for example a series of five pulses for each sample forming the waveform C. The first pulse represents the polarity of the sample, while the remaining four pulses may be a binary weighted (8, 4, 2, 1) representation of the magnitude. Therefore the first sample (—3) forming waveform C may be represented as a sequence of binary pulses 00011. The wave C is shown as having a time duration equal to four times the time duration of the test pulse A but it should be understood that wave C can be and usually is many more times longer than indicated in the drawing. The coded pulses from the storage unit 24 are transmitted through a low speed modulator 26 and a second transmission medium 14', or, if desired, through the first transmission medium 14, to a low speed demodulator 28. From the low speed demodulator 28 the coded pulses are applied to the generator of the present invention shown in one embodiment at 30.

This generator 30 includes a plurality of digital to analog converters 32 which is connected to a summing amplifier circuit 34, a first shift register 36 coupled to each of the digital to analog converters for controlling the magnitude and polarity of the output current therefrom and a second shift register 38 for selectively operating the digital to analog converters 32. The details of the shift register 36 may be found in many texts, for example "Digital Computer Principles" by Wayne C. Irwin, published by D. Van Nostrand Co., Inc. The number of shift cells of this embodiment corresponds to the duration of the waveform B which is equal to the number of bit times for which the waveform B persists. Each of the digital to analog converters 32 includes a terminal connected to a reference voltage source +V, a plurality of resistors 40 each of which may have a different value of conductance corresponding to the particular code used to represent the magnitude of the sample and each of which may be selectively controlled by a corresponding cell in the first shift register 36 by means of a coil as shown in FIG. 1. The resistors 40 are connected to a cell of the second shift register 38 through a first diode 42 and to the summing amplifier circuit 34 through a second diode 44 serially connected to a polarity determining switch *a* which is also controlled by a corresponding cell of the first shift register 36. The summing amplifier circuit 34 consists of first and second phase inverting current summing amplifiers 46 and 48 serially interconnected by a gain determining impedance 50.

A data source 52 which may be, for example, a computer or a digital data storage device is coupled to the input of the second shift register 38. A clock 54 is provided to synchronize the data source 52 with the shift register 38. The output of the current summing amplifier circuit 34 is coupled to the high speed modulator 12 through a low pass filter 56 and the OR circuit 10.

In the operation of the embodiment of the generator illustrated in FIG. 1 of the drawing, a test pulse A is applied to the high speed modulator 12 through the OR circuit 10 for transmission to the high speed demodulator 16 via the transmission medium 14. The distorted waveform B at the output of the high speed demodulator is sampled at times $t_0$, $t_1$, $t_2$, $t_3$ and $t_4$ in sampler 20 and the samples are applied to a quantizer 22 which produces coded pulses (five pulses for each sample) representative of the samples. The coded pulses are applied to the storage circuit 24 and transmitted to the first shift register 36 through the low speed modulator 26, the transmission medium 14' and the low speed demodulator 28. The first shift register 36 has a number of cells indicated as *a*, *b*, *c*, *d* and *e* dependent upon the number of switches, *a'*, *b'*, *c'*, *d'*, and *e'* in one digital to analog converter 32 times the number of digital to analog converters 32 employed. The coded pulses are fed into the first shift register 36 in the same sequence as generated in the quantizer 22. A clock signal is also applied to the input of the first shift register 36 from the low speed demodulator 28. When all of the coded pulses have been stored in the first shift register 36, the switches *a*, *b*, *c*, *d* and *e* of each of the digital to analog converters 32 are selectively operated dependent upon the stored data in the cells of the first shift register 36. Due to the value of the resistors 40 the sum of the current flowing through the closed switches in each converter 32 represents the value of one of the samples of waveform B. It can be seen that there is now stored in generator 30 in analog form a representation of the waveform B.

When a pulse indicating a "1" bit is applied from the data source 52 to the input of the second shift register 38, it is stored in the first cell $S_1$ of the register 38. The presence of the pulse in cell $S_1$ applies a positive voltage to the diode 42 coupled to cell $S_1$ so as to render the diode 42 non-conductive. Accordingly, the current passing through the selected conductances 40 passes through the second diode 44 via the polarity selecting switch *a'* to the current summing amplifier circuit 34, to produce at the output thereof a first step of a waveform D having a duration of one bit period having a magnitude of two units corresponding to the magnitude of the last step of waveform C. The clock 54 advances the pulse from cell $S_1$ to $S_2$ to produce during the second bit interval a second step of the waveform D having a magnitude of five units corresponding to the penultimate step in the waveform C. Accordingly, it can be seen that as the pulse passes from cell $S_2$ to $S_3$ a third step producing a voltage having a value of 8 units corresponding to the antepenultimate step of waveform C and a pulse passing through $S_3$ to $S_4$ producing the fourth step of waveform D corresponding to the first step of waveform C. Accordingly it can be seen that there is produced at the output of the amplifier circuit 34 a waveform D which is time reversed replica of waveform C. After the waveform D is passed through the low pass filter 56 which smooths the waveform to produce a waveform E which is a time reversed replica of waveform B. The waveform E after passing through the high speed modulator 12, the transmission medium 14 and the high speed demodulator 16 appears at the output of demodulator 16 as a substantially square wave of one bit period duration similar to that applied to the input of the second shift register 38. Although the generator has been described as producing one sample per bit time, it should be understood that in a practical system a higher sampling frequency must be used to satisfy the Shannon theorem which states that the sampling frequency must be greater than twice the highest frequency components present in the signal to be reconstructed.

Figure 2:
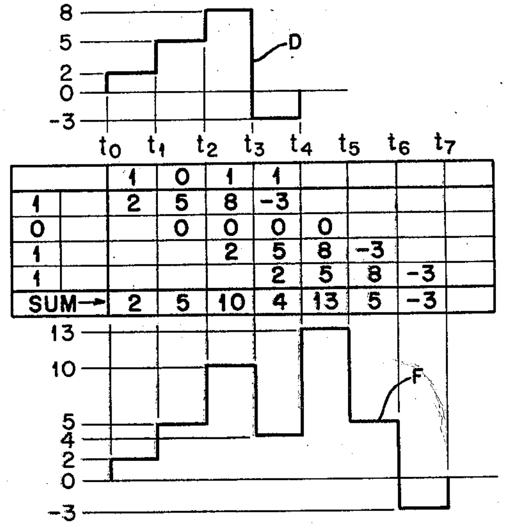
FIG. 2 illustrates a type of waveform which is produced by the generator of the present invention.

If a data sequence, for example, 1011, is passed through the system illustrated in FIG. 1 of the drawing the generator 30 will produce at the output of the summing amplifier circuit 34 a waveform F as illustrated in FIG. 2 of the drawing. It can be seen that waveform F is a linear superposition of the waveform D corresponding to the data sequence 1011 which appears undistorted as a 1011 waveform G before being applied to a utilization device 19, which may be a computer or any suitable storage device.

As stated hereinabove a plurality of samples N may be taken during each bit interval, when N samples are taken during each bit interval the number of digital to analog converters and cells in the first and second shift registers 36 and 38 must be multiplied by N if the embodiment of FIG. 1 is employed. The clock 54 producing N shift pulses for each data pulse.

Figure 3:
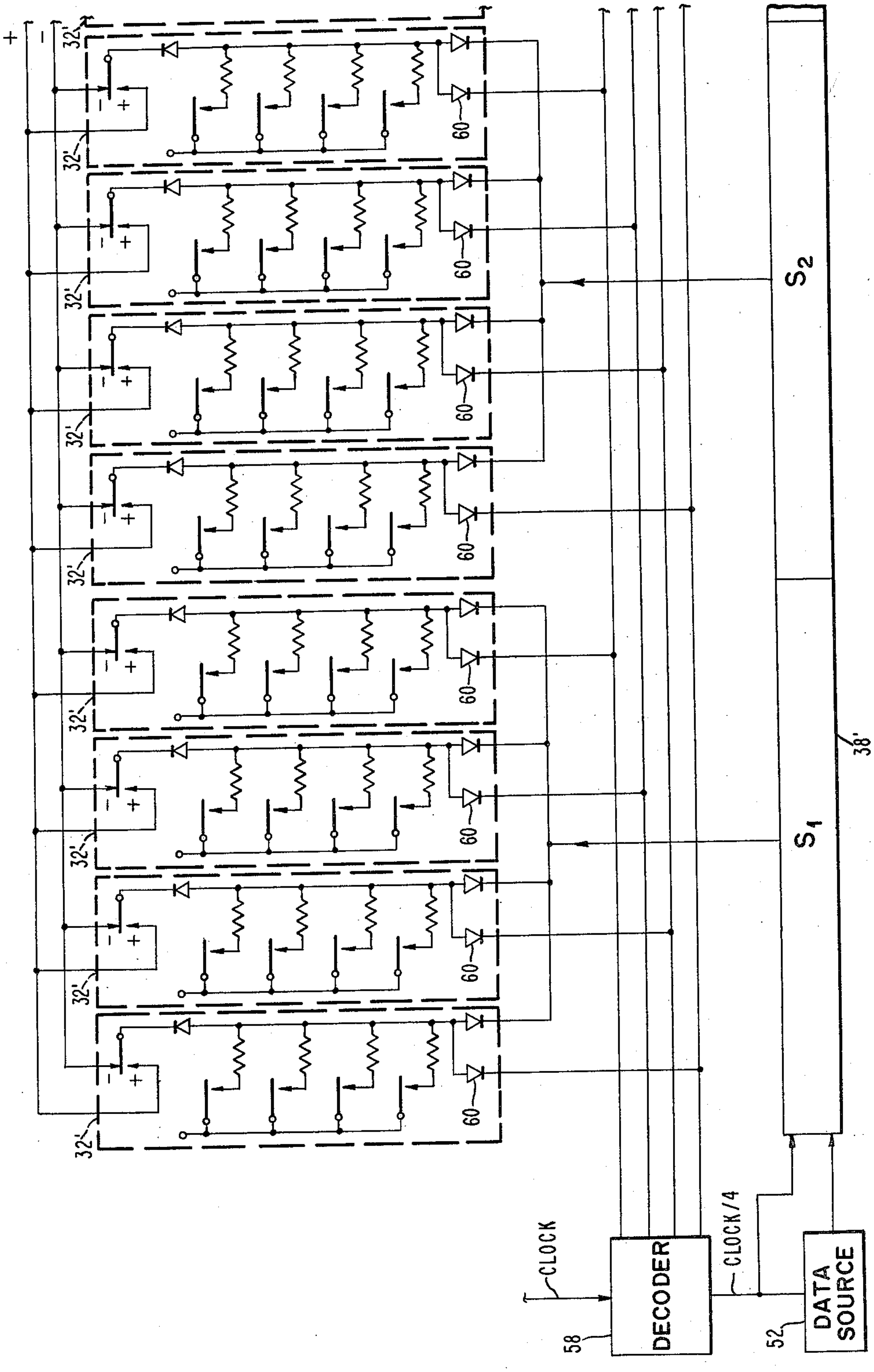
FIG. 3 shows a modification of a portion of the waveform generator illustrated in FIG. 1.

In the embodiment illustrated in FIG. 3 of the drawing there is shown a generator of the present invention which has a shift register 38′, a decoder 58 and digital to analog converter 32′ each of which is similar to the digital to analog converters 32 of FIG. 1 but additionally includes a third diode 60. The shift register 38′ has one shift cell for each bit time of the received distorted waveform. There are N, four in the example of FIG. 3, digital to analog converters for each shift cell of 38′. Each of the cells of shift register 38′ are coupled to four digital to analog converters 32′ where N is equal to 4. A decoder 58 responsive to a clock producing in time sequence an output on each of four lines each of which are applied to the third diode 60 of one of the four digital to analog converters 32′ associated with a given cell of shift register 38′. The data source 52 and the shift register 38′ are synchronized by pulses at ¼ the clock frequency derived from the decoder 58.

In the operation of the embodiment illustrated in FIG. 3 of the drawing, the digital to analog converters 32′ are loaded as described hereinabove in connection with the digital to analog converter 32 in FIG. 1 of the drawing. After the digital to analog converters are loaded a current is provided to the summing amplifier only when the shift cell output is positive and a positive output exists on the appropriate decoder output. Accordingly it can be seen that in the embodiment illustrated in FIG. 3 only one shift cell of the register 38′ is required per bit period even though four samples are taken during a bit period.

Although the embodiments of the generator of the present invention have been illustrated and described in connection with the time reversal equalization techniques, it should be understood that the invention is not limited thereto. For example, the generator of this invention may be utilized in the system described in a commonly assigned copending application Serial No. 245,498 filed by K. E. Schreiner on even date, wherein waveforms may be generated which are matched to the amplitude and phase characteristics of the communication channel.

Figures 4, 5:
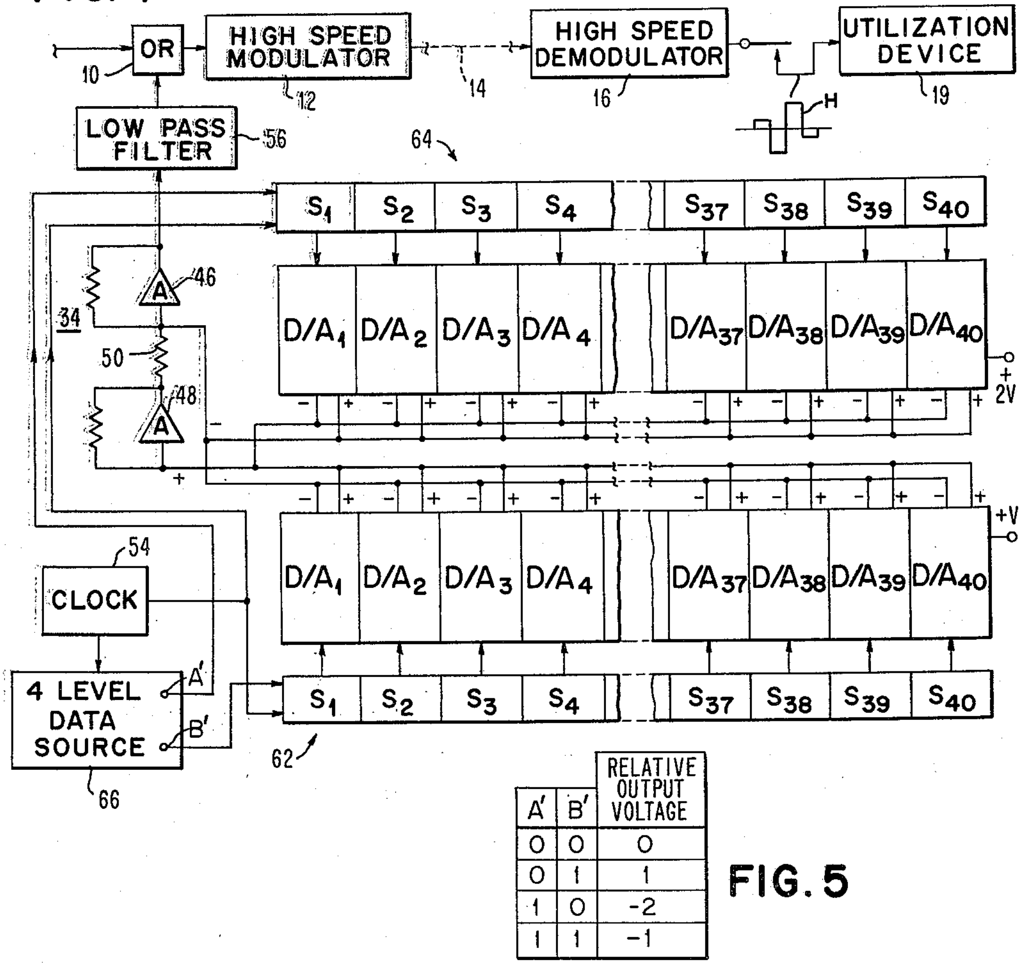
FIG. 4 illustrates a waveform generator of the present invention which may be used to form four-level signals.
FIG. 5 is a table indicating the four possible output levels from the generator illustrated in FIG. 4.

It is known that four level transmission can be employed to achieve higher data transmission speeds than is obtainable with strictly binary signaling. When it is desired to transmit a four level signal and the appropriate unit waveform representing a binary "1" is stored and is known then the embodiment of FIG. 4 may be employed. In FIG. 4 there is shown a pair of generators 62 and 64 which are loaded by a common register similar to register 36 of FIG. 1 of the drawing or of any appropriate storage register for controlling digital to analog converters in a manner similar to that described in connection with FIG. 1 of the drawing.

The first generator 62 has a given reference voltage +V applied to a terminal of each of the digital to analog converters. The second generator 64 is similar to the first generator 62 but it has a reference voltage +2V which is twice the magnitude of the voltage supplied to the digital to analog converters of generator 62. Alternatively the reference voltages of first and second generators 62 and 64 may be identical if the conductances of the digital to analog converters of one of the generators are given twice the weight of the corresponding conductances of the other generator. The positive output of one of the generators is connected to the negative output of the other generator and vice versa. A two channel data source indicated in the drawing as a four level data source 66, which produces two data pulses A′ and B′ simultaneously per bit time drives the registers of each of the generators 62 and 64. The entire storage register contains a digital representation of a waveform corresponding to a binary "1." The signal appearing at the output of the summing amplifier 34 will be a four level analog representation of the data pulses to produce at the input of the utilization device 19 an undistorted four level waveform such as indicated at *h*.

Referring to FIG. 5, the four possible combinations of data outputs A′ and B′ from data source 66 which result in four corresponding analog levels at the output of the amplifier 34 are shown. The analog levels may be made symmetrical by adding a relative voltage of ½ to the output. Each of the generators 62 and 64 of FIG. 4 are similar to the generator 30 illustrated in FIG. 1 of the drawing, however, it should be understood that each of the generators 62 and 64 may be of the type illustrated in FIG. 3 of the drawing.

Accordingly, it can be seen that a generator has been provided which is capable of producing in response to a digital data sequence a multi-level analog output which represents a linear superposition of a digital stored representation of a binary "1" corresponding to the data sequence.

While the invention has been particularly shown and described with reference to preferred embodiments thereof, it will be understood by those skilled in the art that various changes in form and details may be made therein without departing from the spirit and scope of the invention.

What is claimed is:

1. A waveform generator comprising
   (*a*) a summing network,
   (*b*) a plurality of digital to analog converters having parallelly arranged outputs coupled to said network.
   (*c*) a first shift register means for providing each of said converters with a digital representation of an analog signal, and
   (*d*) a second shift register means for selectively controlling the outputs of said converters to generate at said summing network a waveform composed of the signals supplied by each of said digital-to-analog converters.

2. A waveform generator as set forth in claim 1 wherein each of said converters includes a plurality of parallelly arranged resistors each having different values of conductance.

3. A waveform generator as set forth in claim 1 wherein said network is a summing amplifier circuit.

4. A waveform generator as set forth in claim 2 wherein each of said converters further includes
   (*a*) a plurality of switches each respectively coupled to one of said conductances, and
   (*b*) said first shift register having a plurality of cells each connected to control one of said switches.

5. A waveform generator as set forth in claim 4 wherein each of said converters further includes a polarity determining switch controlled by a respective cell of said first shift register.

6. A waveform generator as set forth in claim 1 wherein said second shift register includes a plurality of cells, each cell being coupled to at least two of said analog to digital converters.

7. A waveform generator as set forth in claim 6 further including means for sequentially controlling the outputs of said at least two analog to digital converters.

8. A generator comprising
   (*a*) first and second plurality of digital to analog converters, first and second shift registers coupled to said first and second digital to analog converters, respectively, for controlling the outputs thereof.
   (*b*) a third shift register coupled to said first and second plurality of digital to analog converters to provide said converters, with a digital representation of an analog signal, (c) a summing network, each of said converters having positive and negative output terminals and one of said first and second plurality of converters providing a signal at each of its terminals substantially larger than the signal at corresponding terminals of the other plurality of converters, and (d) means coupled to said summing network for interconnecting the positive terminals of said first plurality of converters to the negative terminals of said second plurality of converters and for interconnecting the negative terminals of said first plurality of converters to the positive terminals of said second plurality of converters.

9. Apparatus for converting a train of binary signals representing a plurality of samples of an analog waveform into an output waveform including a plurality of superimposed, time reversed replicas of said analog waveform in response to a series of data control signals, comprising:

(a) a first shift register including a plurality of cells for storing said train of binary signals;

(b) a number of digital to analog converters equal to the number of samples of said analog waveform, each of said digital to analog converters being connected to a different group of cells in said first registers, each group representing one of said samples, to convert the binary signals in said groups into a plurality of analog replicas of said samples;

(c) a second shift register including a plurality of cells each one connected to activate at least one of said digital to analog converters, said second shift register being capable of shifting said series of data control signals sequentially through the cells of said second shift register to activate said digital to analog converters in a sequential order corresponding to the reverse order in which the samples of said analog waveform are arranged; and (d) summing means having said digital to analog converters connected in parallel thereto for adding the analog replicas of said samples together to generate said output waveform.

References Cited by the Examiner

UNITED STATES PATENTS

| | | | |
|---|---|---|---|
| 2,516,587 | 7/50 | Peterson | 325—41 |
| 2,522,738 | 9/50 | Bayard et al. | 178—69.2 |
| 3,011,135 | 11/61 | Stump et al. | 333—16 |
| 3,071,739 | 1/63 | Runyon | 325—42 |

ARTHUR GAUSS, *Primary Examiner.*